United States Patent
Ushiku

(10) Patent No.: US 8,760,696 B2
(45) Date of Patent: Jun. 24, 2014

(54) IMAGE PROCESSING APPARATUS FOR EXECUTING IMAGE PROCESSING IN ACCORDANCE WITH OPERATION CONDITION METHOD FOR CONTROLLING THE SAME, AND STORAGE MEDIUM

(75) Inventor: Toru Ushiku, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 13/361,132

(22) Filed: Jan. 30, 2012

(65) Prior Publication Data

US 2012/0194842 A1 Aug. 2, 2012

(30) Foreign Application Priority Data

Feb. 2, 2011 (JP) ................................. 2011-020776

(51) Int. Cl.
*G06F 3/12* (2006.01)
*H04N 1/00* (2006.01)

(52) U.S. Cl.
USPC ......................................... 358/1.15; 358/1.1

(58) Field of Classification Search
USPC ............... 358/1.1, 1.9, 1.13, 1.14, 1.15, 1.18, 358/402, 474; 399/8, 9, 37, 70
See application file for complete search history.

(56) References Cited

U.S. PATENT DOCUMENTS

| | | | | |
|---|---|---|---|---|
| 2009/0314837 | A1* | 12/2009 | Kataoka et al. | 235/385 |
| 2011/0317200 | A1* | 12/2011 | Honda et al. | 358/1.14 |
| 2012/0050792 | A1* | 3/2012 | Uozumi | 358/1.15 |
| 2013/0027725 | A1* | 1/2013 | Snyder et al. | 358/1.13 |

FOREIGN PATENT DOCUMENTS

JP 2001-148751 A 5/2001

* cited by examiner

*Primary Examiner* — Gabriel Garcia
(74) *Attorney, Agent, or Firm* — Canon USA Inc IP Division

(57) ABSTRACT

According to the present invention, a user can switch an operation condition of an image processing apparatus while confirming a power saving effect. To this end, the image processing apparatus determines usage status of a print mode, determines an operation condition to be changed based on the determined usage status, and determines the electric energy to change if the operation condition is changed. The image processing apparatus shows the user the operation condition to be changed and how much the amount of electric energy is changed.

8 Claims, 11 Drawing Sheets

FIG. 5

PRINT MODE COUNT TABLE

| NUMBER OF TOTAL PRINTS | 100 pages |
|---|---|
| Color | 80 pages |
| 1200dpi | 10 pages |
| SIZE-REDUCTION PAGES | 90 pages |
| ROTATED PAGES | 85 pages |

USAGE RATE MANAGEMENT TABLE

| Color | 80% |
|---|---|
| 1200dpi | 10% |
| SIZE-REDUCTION PAGES | 90% |
| ROTATED PAGES | 85% |

CURRENT PRINT MODE

| Color | ON |
|---|---|
| 1200 dpi HIGH SPEED | ON |
| SIZE-REDUCTION PAGES | ON |
| ROTATED PAGES | ON |

| Color | 80% |
|---|---|
| 1200dpi | 70% |
| SIZE-REDUCTION PAGES | 90% |
| ROTATED PAGES | 85% |

CURRENT PRINT MODE

| Color | ON |
|---|---|
| 1200 dpi HIGH SPEED | OFF |
| SIZE-REDUCTION PAGES | ON |
| ROTATED PAGES | ON |

1101

IMAGE PROCESSING APPARATUS FOR EXECUTING IMAGE PROCESSING IN ACCORDANCE WITH OPERATION CONDITION METHOD FOR CONTROLLING THE SAME, AND STORAGE MEDIUM

BACKGROUND OF THE INVENTION

1. Field of the Invention

The present invention relates to an image processing apparatus for executing image processing according to operation conditions.

2. Description of the Related Art

In consideration of environmental problems, the saving of power consumption has been demanded in various electronic apparatuses including an image processing apparatus. To save such power consumption, the electronic apparatuses are cutting off power supplied to unused components and setting power saving modes. Japanese Patent Application Laid-Open No. 2001-148751 discusses a technique in which a user can select the setting of a power saving mode for each component of an electronic apparatus.

An issue exists however in the setting of the power saving mode in the image processing apparatus discussed in Japanese Patent Application Laid-Open No. 2001-148751 in that a user cannot switch the operation conditions of the image processing apparatus while confirming a power saving effect to adapt to change in the usage status of a print mode actually used.

SUMMARY OF THE INVENTION

One aspect of the present invention is directed towards providing a mechanism in which a user can switch the operation conditions of an image processing apparatus while confirming a power saving effect.

According to an aspect of the present invention, an image processing apparatus for executing image processing in accordance with operation conditions includes a first determination unit configured to determine usage status of a print mode, a second determination unit configured to determine an operation condition to be changed based on the usage status determined by the first determination unit, a third determination unit configured to determine how much an amount of electric energy changes if the operation conditions is changed, and an instruction reception unit configured to display the operation condition to be changed, how much the amount of electric energy changes, and to receive an instruction for changing the operation condition.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a print mode count table.

FIG. 7 is a management table for managing a usage rate by print mode.

FIG. 8 is a management table for managing a set state by current print mode.

FIG. 10 illustrates a management table for managing a usage rate by print mode.

FIG. 11 illustrates a management table for illustrating set state by current print mode.

DESCRIPTION OF THE EMBODIMENTS

Various exemplary embodiments, features, and aspects of the invention will be described in detail below with reference to the drawings.

Figure 1:
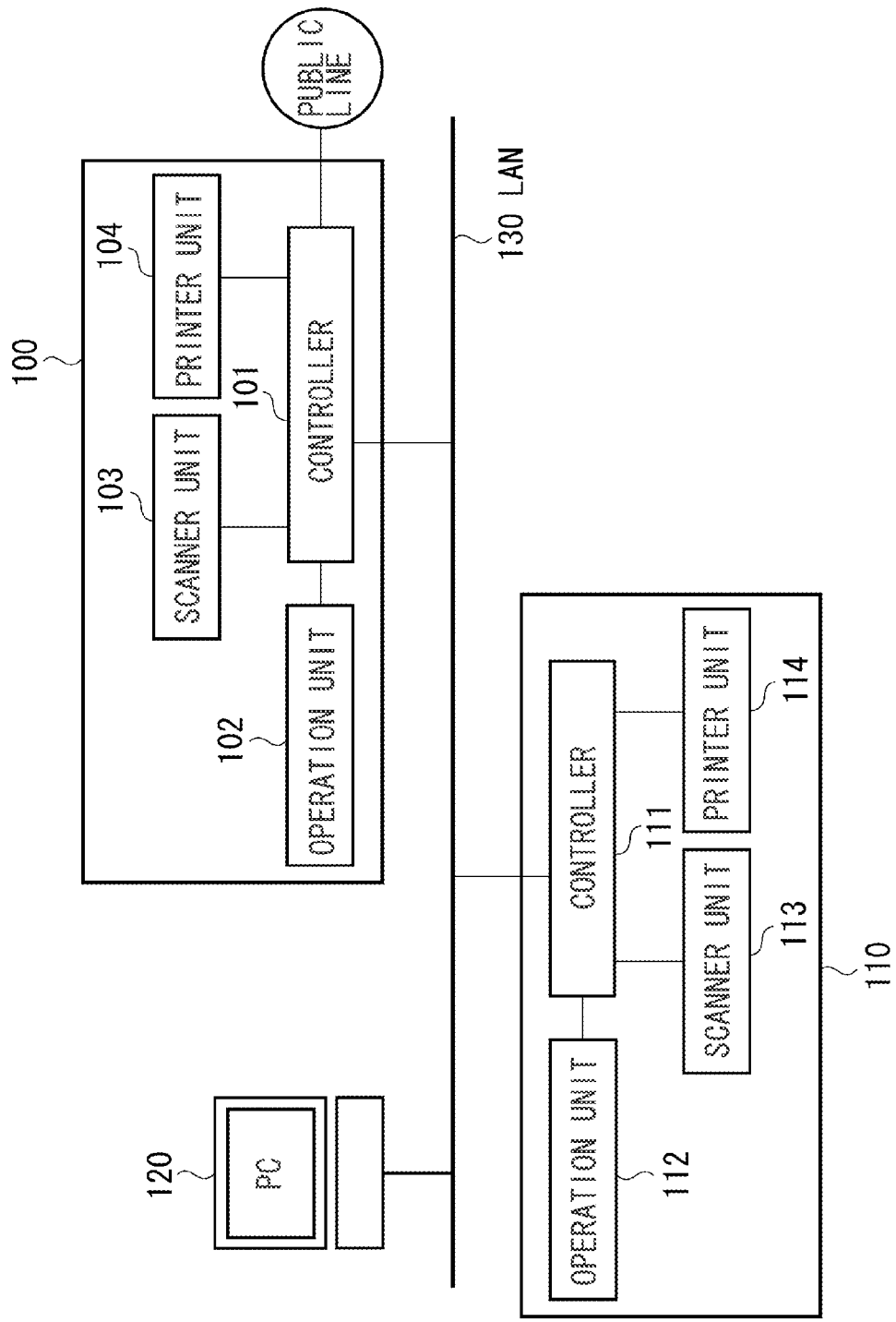
FIG. 1 is a block diagram illustrating the configuration of an image processing system.

An exemplary embodiment for executing the present invention is described below with reference to the drawings. In the present exemplary embodiment, a digital multifunction peripheral (MFP), which includes a plurality of functions such as scanning, printing, and copying will be used as an example of an image processing apparatus FIG. 1 is a block diagram illustrating the configuration of an image processing system according to a first exemplary embodiment of the present invention. Although, in this exemplary embodiment, a host computer 120 and two image processing apparatuses 100 and 110 are connected to local area network (LAN) 130, any number of apparatuses can be part of the image processing system.

In the present exemplary embodiment, although a LAN is applied as a connection method, the present exemplary embodiment is not limited to the LAN. For example, any network, such as a wide area network (WAN) (public line), a serial transmission method such as a universal serial bus (USB), or a parallel transmission method such as Centronics and a small computer system interface (SCSI) are also applicable.

The host computer 120 (herein after referred to as PC) includes functions of a personal computer. The PC 120 can transmit and receive files and e-mails using a file transfer protocol (FTP) or a server management block (SMB) protocol via the LAN 130. Furthermore, the host computer 120 can, via a printer driver, instruct the image processing apparatuses 100 and 110 to print. The image processing apparatuses 100 and 110 are similar in configuration.

The image processing apparatus 100 includes a scanner unit 103 serving as an image input device, a printer unit 104 serving as an image output device, a controller 101 for controlling the operation of the entire image processing apparatus 110, and an operation unit 102 serving as a user interface (UI). The operation unit 102 functions not only as a presentation unit for presenting various displays to the user, but also as an instruction reception unit for receiving various instructions from the user.

Similarly, the image processing apparatus 110 includes a scanner unit 113 serving as an image input device, a printer unit 114 serving as an image output device, a controller 111 for controlling the operation of the entire image processing apparatus 110, and an operation unit 112 serving as a user interface (UI).

Figure 2:
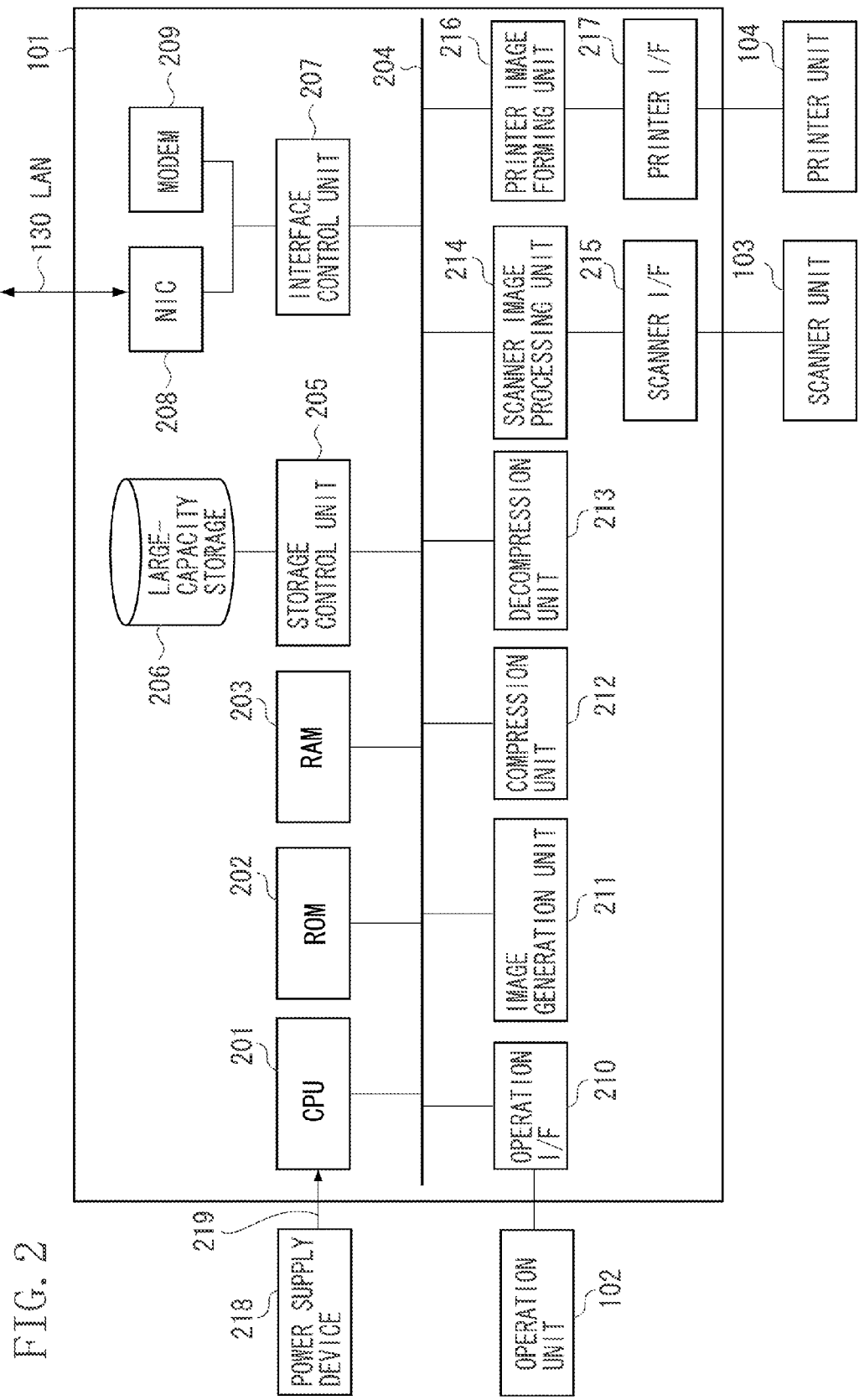
FIG. 2 is a block diagram illustrating the configuration of a controller illustrated in FIG. 1.

FIG. 2 is a block diagram illustrating the configuration of the controllers 101 and 111 illustrated in FIG. 1. In FIG. 2, a central processing unit (CPU) 201 is a control unit for controlling the entire image processing apparatus 100. The CPU 201 causes a boot program stored in a read only memory (ROM) 202 to start an operation system (OS). The CPU 201 causes the OS to execute the controller program and various applications stored in a large-capacity storage 206. The CPU 201 is connected to each unit by an internal bus, such as a data bus 204. A RAM 203 operates as a temporary storage area for the main memory or work area of the CPU 201 and is also used as a temporary storage area for image processing. In the RAM 203, a storage area for storing a print mode setting state for switching the operation conditions of the image processing apparatus is reserved.

An interface control unit 207 controls the network interface (I/F) such as a network interface card (NIC) 208, and transmits and receives various kinds of data such as image data over a network, such as an LAN. The interface control unit 207 also controls a modem 209 to transmit and receive data over a telephone line.

An operation I/F 210 receives input of a user's operation instructions from the operation unit 102, such as a touch panel or a hard key. The operation I/F 210 controls the operation unit 102 which includes a display unit such as a liquid crystal display (LCD), a cathode ray tube (CRT) and the like to display operation screens to the user.

An image generation unit 211 generates bitmap data and attribute data that can be processed by the printer unit 104 based on data received via the interface control unit 207. A compression unit 212 compresses the bitmap data and the attribute data. A decompression unit 213 decompresses the data compressed by the compression unit 212 to generate the bitmap data and the attribute data.

A scanner image processing unit 214 performs correction, modifying, and editing of the bitmap data received from the scanner unit 103 via a scanner interface (I/F) 215. The scanner image processing unit 214 determines whether the received bit map data is a color document or monochrome document, or whether it is a text document or a photographic document. The determination is attached to the image data as attribute data. A printer image forming unit 216 performs an image processing for a printer to transmit the bitmap data to the printer unit 104 via a printer interface (I/F) 217. A power supply device 218 supplies electric power to the controller 101 via a power supply line 219.

Figure 3:
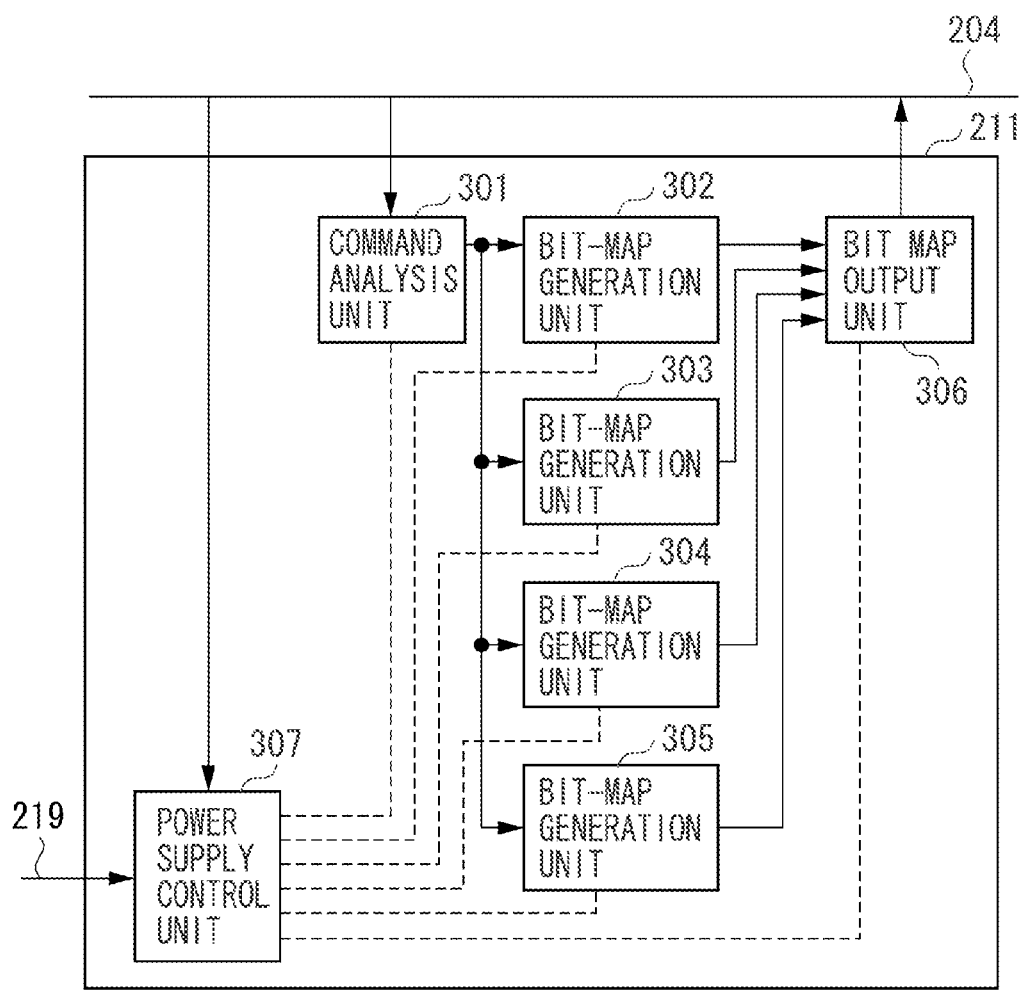
FIG. 3 is a block diagram illustrating the configuration of an image generation unit illustrated in FIG. 2.

FIG. 3 is a block diagram illustrating the configuration of the image generation unit 211 illustrated in FIG. 2. In FIG. 3, a command analysis unit 301 analyzes the received data and requests bit-map generation units 302 to 305 to generate a bit map. The bit-map generation units 302 to 305 generate bit map data in response to the request of the command analysis unit 301 and transmit the bit map data to a bit map output unit 306.

The bit map output unit 306 outputs the bit map data received from the bit-map generation units 302 to 305 to the RAM 203. Furthermore, the bit map output unit 306 generates attribute data corresponding to the bit map data and outputs the attribute data to the RAM 203. A power supply control unit 307 receives electric power via the power supply line 219 and controls the power of the image generation unit 211. The image generation unit 211 in the present exemplary embodiment is configured to realize a print speed of 40 page per minute (ppm) at a resolution of 1200 dots per inch (dpi).

In the present exemplary embodiment, the image generation unit 211 includes a plurality of bit-map generation units acting as image processing units. The number of the bit-map generation units to be used is changed to allow a power saving effect to be changeable. The CPU 201 controls power supplied to at least one or more image processing units in accordance with the set operation conditions.

Figure 4:
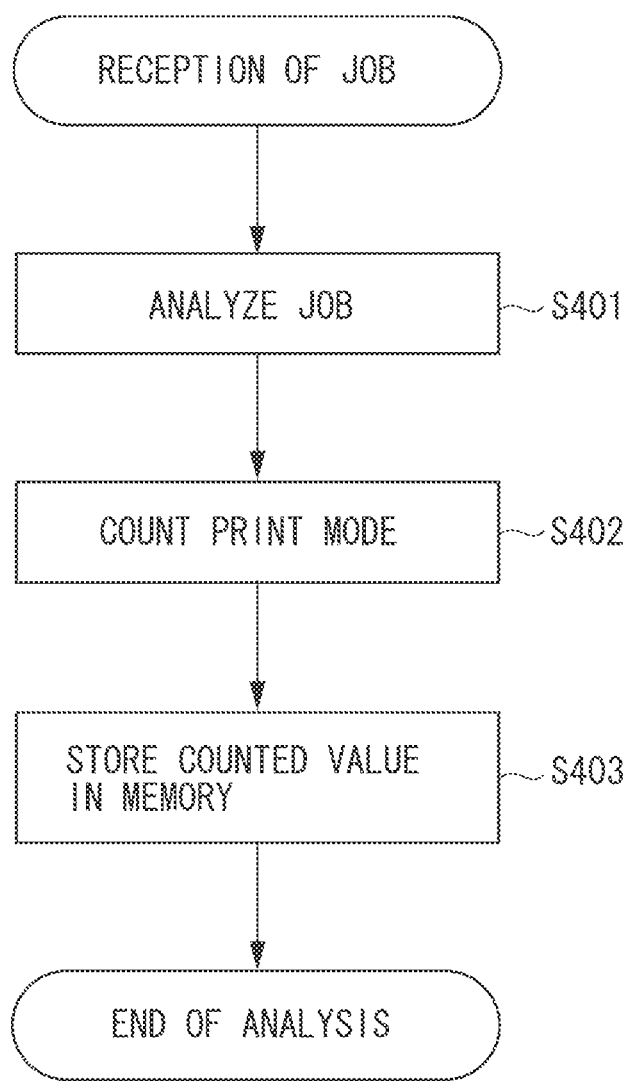
FIG. 4 is a flow chart illustrating the data processing procedure of the image processing apparatus.

FIG. 4 is a flow chart illustrating the data process of the image processing apparatus according to the present exemplary embodiment. In the present exemplary embodiment, print modes executed in the jobs are counted up each time the print mode is executed to accumulate the usage status of each print mode. Each step is realized by the CPU 201 loading the control program stored in the ROM 202 and others to the RAM 203 and executing the program.

In step S401, the CPU 201 receives a JOB and then analyzes the received job. In step S402, the CPU 201 counts (measures) the print mode used in the JOB. In step S403, the CPU 201 adds the value counted in step S402 to the counted value already stored in the RAM 203. The CPU 201 acts as a determination unit which determines usage status of the print mode.

FIG. 5 illustrates an example of a print mode count table 501. The print mode count table 501 manages the usage status of each print mode and stores counted values for each print mode. For example, FIG. 5 illustrates that a print job of 100 pages is finished and 80 pages out of 100 pages are printed in color. Similarly, FIG. 5 illustrates that 10 pages are printed at a resolution of 1200 dpi (hereinafter referred to as 1200 dpi print mode), 90 pages are printed with images enlarged or reduced, and 85 pages are printed with images rotated. The print mode count table 501 is stored in the RAM 203 illustrated in FIG. 2.

Figure 6:
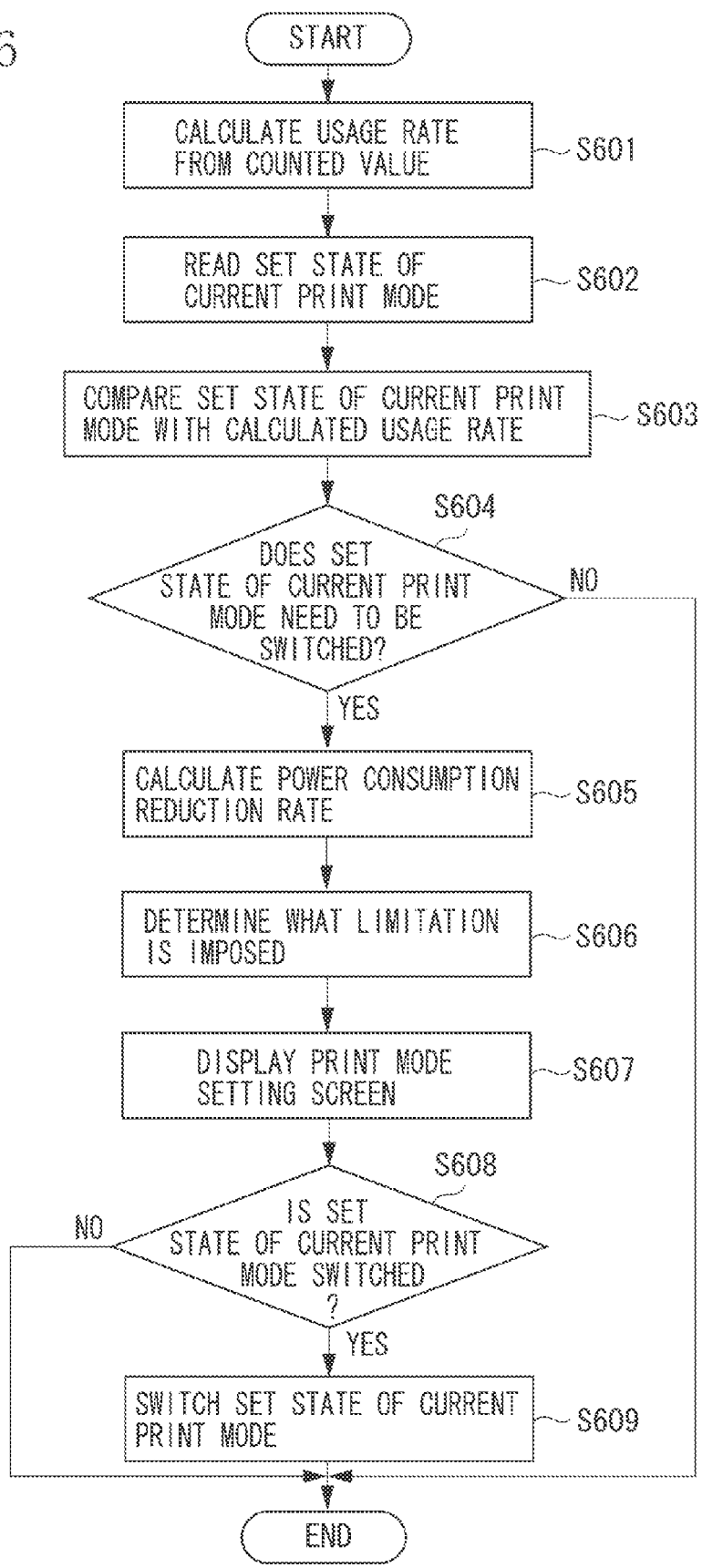
FIG. 6 is a flow chart illustrating the data processing procedure of the image processing apparatus.

FIG. 6 is a flow chart illustrating an example of the data process of the image processing apparatus according to the present exemplary embodiment. In the present exemplary embodiment, the CPU 201 determines the usage status of a print mode, notifies the user that the print mode is switched to produce a power saving effect, receives instruction for switching the print mode from the user, and switches the print mode. Each step is realized by the CPU 201 loading the control program stored in the ROM 202 and others to the RAM 203 and executing the program.

In step S601, the CPU 201 reads the counted value of each print mode stored in the RAM 203 and calculates a usage rate for each print mode. In step S601, the CPU 201 determines usage status of each print mode. FIG. 7 illustrates an example of a usage rate for each print mode. FIG. 7 is a management table 701 for managing a usage rate for each print mode. The usage rate for each print mode is calculated by dividing the number of times of usage of the print mode by the number of prints executed by the image processing apparatus. More specifically, the usage rate for each print mode is calculated by dividing the number of pages in which the print mode is used is divided by the number of the total printed pages. The example shows that the usage rate of the 1200 dpi print mode is 10%, which is low in usage rate. The management table 701 is stored in the RAM 203 illustrated in FIG. 2.

In step S602, the CPU 201 reads the set state of a current print mode from the RAM 203. In step S603, the CPU 201 compares the set state of the current print mode with usage rate for each of the calculated print modes. FIG. 8 illustrates an example of a set state for each current print mode. FIG. 8 illustrates a management table 801 for managing a set state for each current print mode. In FIG. 8, the term "ON" represents that the print mode can be used. The term "OFF" represents that the use of the print mode is limited. The management table 801 is stored in the RAM 203 illustrated in FIG. 2. The set state for each print mode stored in the management table 801 is the operation conditions of the image processing apparatus.

In step S604, the CPU 201 determines whether the set state of a print mode needs to be switched from the comparison results in step S603. The CPU 201 acts as a determination unit which determines an operation condition to be changed based on the usage status. If the CPU 201 determines that the print mode does not need to be switched (NO in step S604), a print mode setting flow is ended.

According to the present exemplary embodiment, the set state of the print mode is brought into the ON state when the usage rate of the print mode is greater than or equal to 50%. If the usage rate of the print mode is less than 50%, the present exemplary embodiment determines that the set state of the print mode is brought into the OFF state. In the examples illustrated in FIGS. 7 and 8, while all of set states of the current print mode are ON, the calculated usage rate of 1200 dpi print mode is 10%. Because the usage rate of 1200 dpi print mode is less than 50%, the CPU 201 determines that the set state of the print mode needs to be switched.

If the CPU 201 determines that the set state of the print mode needs to be switched from the results of the comparison of the set state of the current print mode with the calculated usage rate (YES in step S604), in step S605, the CPU 201 calculates a power consumption reduction rate changed when the set state is switched. The CPU 201 acts as a determination unit which determine how much an amount of electric energy changes if an operation condition is changed. In step S606, the CPU 201 determines what limitation is imposed.

The CPU 201 calculates a power consumption reduction rate in a case where the set state of high-speed print mode at 1200 dpi (hereinafter referred to as 1200 dpi high-speed print mode) is, for example, is brought into the OFF state. In the present exemplary embodiment, in a case where the set state of 1200 dpi high-speed print mode is brought into the OFF state, printing at 1200 dpi can still be executed, but a print speed at 1200 dpi is changed to 25%. In other words, the print speed at 1200 dpi is limited to 10 ppm from 40 ppm. The CPU 201 turns off power supplied to the bit-map generation units 303 to 305 in the bit-map generation units 302 to 305 described in FIG. 3. Thereby, the power consumption of the image generation unit 211 is reduced. In the present exemplary embodiment, the amount of consumption power reduced by the saving in the entire image processing apparatus is 5%. The CPU 102 determines that a print speed in the case of printing at 1200 dpi is 25% as a limitation to be imposed.

In step S607, the CPU 102 executes a display control for displaying the calculated usage rate and power consumption reduction rate and also what limitation is imposed as a print mode setting screen to be displayed on the operation unit 102. In step S608, the CPU 201 determines whether the user gives instructions for switching the set state of the print mode. If the user gives instructions for switching the set state of the print mode (YES in step S608), in step S609, the CPU 201 switches the set state of the print mode to be able to expect power saving effect and ends the present processing. At this point, the contents of the management table 801 illustrated in FIG. 8 are also updated at the same time.

Figure 9:
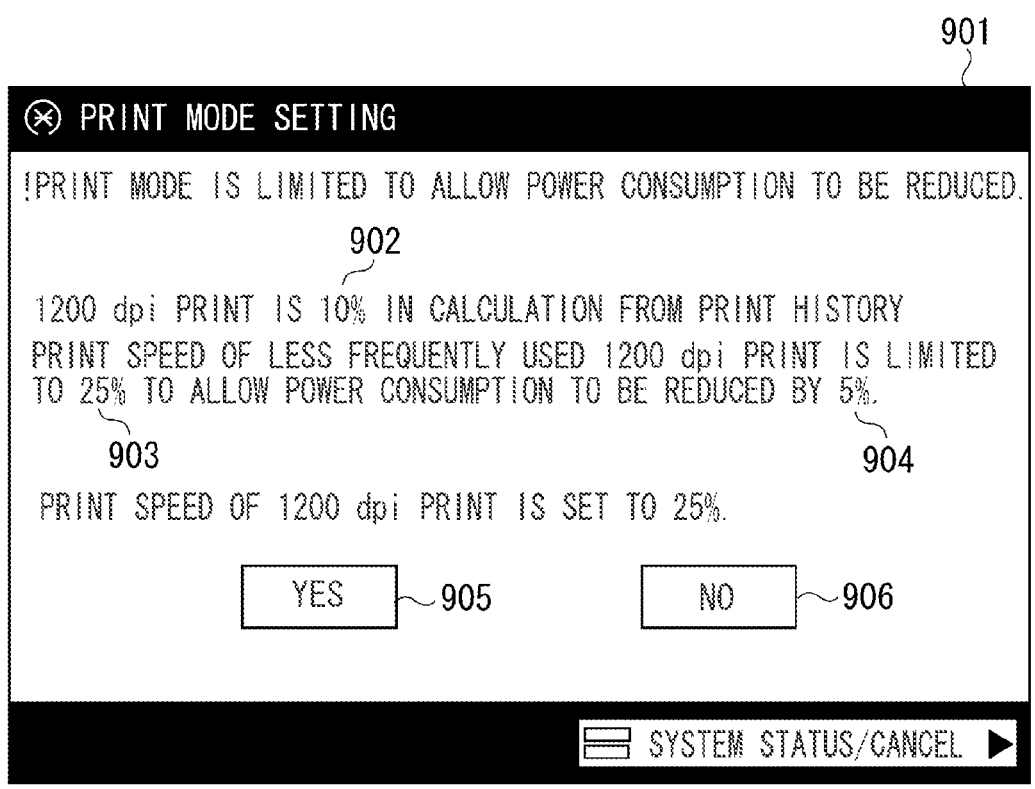
FIG. 9 is a chart illustrating a confirmation screen for instructing the limitation of function of a print mode.

FIG. 9 is a chart illustrating an example of a print mode setting screen 901 displayed on the operation unit 102 illustrated in FIG. 2. The example in FIG. 9 displays a print usage rate 902, the content of limitation 903, and a power consumption reduction rate 904. This screen is merely an example, and the layout of each button and message to be displayed on the print mode setting screen 901 are not limited to the contents of the present example.

In step S609, if the user presses the "YES" button 905 displayed as instruction information on the screen, the CPU 201 brings "1200 dpi high-speed print mode" in the management table illustrated in FIG. 8 into the OFF state.

If the user presses the "NO" button 906 displayed as instruction information, the CPU 201 keeps "1200 dpi high-speed print mode" in the ON state.

Thus, the set state of the print mode is switched according to the usage status of the print mode to allow providing an operation environment, in consideration of user's convenience, in which the user can set a selectable power saving mode.

A second exemplary embodiment is described below. FIG. 10 illustrates a management table 1001 for managing a usage rate by print mode. The example illustrates a usage rate of 70% at 1200 dpi. The management table 1001 is stored in the RAM 203 illustrated in FIG. 2.

FIG. 11 illustrates a management table 1101 for managing set state for each current print mode. In example illustrated in FIG. 11, the 1200 dpi high-speed print mode is brought into the OFF state. The management table 1101 is managed by the CPU 201 in the RAM 203.

The control procedure of the present exemplary embodiment is described below with reference to the flow chart in FIG. 6 based on the state of the management table illustrated in FIGS. 10 and 11.

In step S601, the processing is started and the CPU 201 reads the counted value of each print mode stored in the RAM 203 and calculates a usage rate for each print mode similarly to the management table illustrated in FIG. 10. In step S602, the CPU 201 reads the set state of a current print mode from the management table 1101 illustrated in FIG. 10.

In step S603, the CPU 201 compares the set state of the current print mode with the usage rate calculated by the CPU 201. In the present exemplary embodiment, as illustrated in FIG. 11, "1200 dpi high-speed print mode" is in the OFF state in the set state of the current print mode while the calculated usage rate of "1200 dpi print mode" is 70%. In step S604, the usage rate of "1200 dpi print mode" is greater than or equal to 50%, so that the CPU 201 determines that the set state of the print mode needs to be switched.

Figure 12:
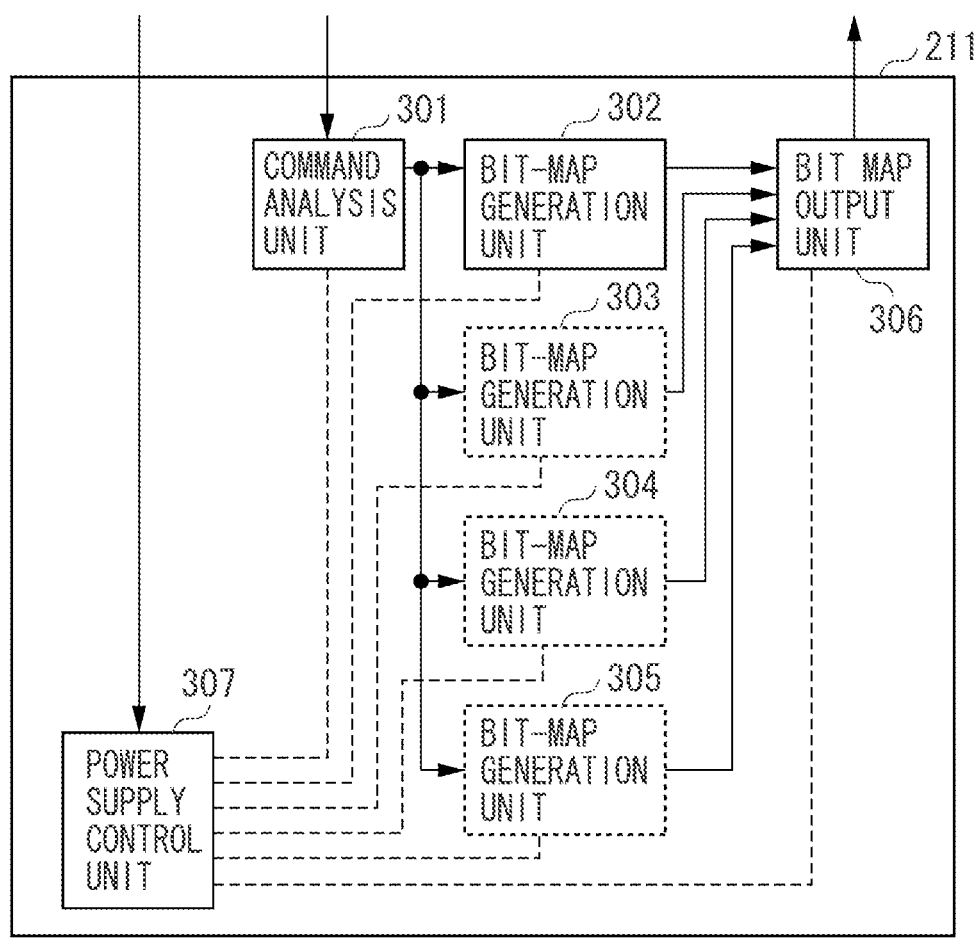
FIG. 12 is a block diagram describing energizing state in the image generation unit.

In step S605, the CPU 201 calculates a power consumption increase rate in a case where the set state of "1200 dpi high-speed print mode" is brought into the ON state. FIG. 12 illustrates a state of how the image generation unit 211 is energized in a case where the set state of "1200 dpi high-speed print mode" is brought into the OFF state.

In FIG. 12, the command analysis unit 301, the bit-map generation unit 302, the bit map output unit 306, and the power supply control unit 307, which are indicated by solid lines, are energized. A plurality of bit-map generation units 303 to 305 for executing image processing used for print processing, which is indicated by broken lines, is not energized. If the set state of "1200 dpi high-speed print mode" is brought into the ON state, the bit-map generation units 303 to 305 are energized. In other words, the power consumption of the image generation unit 211 is increased. In the present exemplary embodiment, the total power consumption increase rate is 5%.

Figure 13:
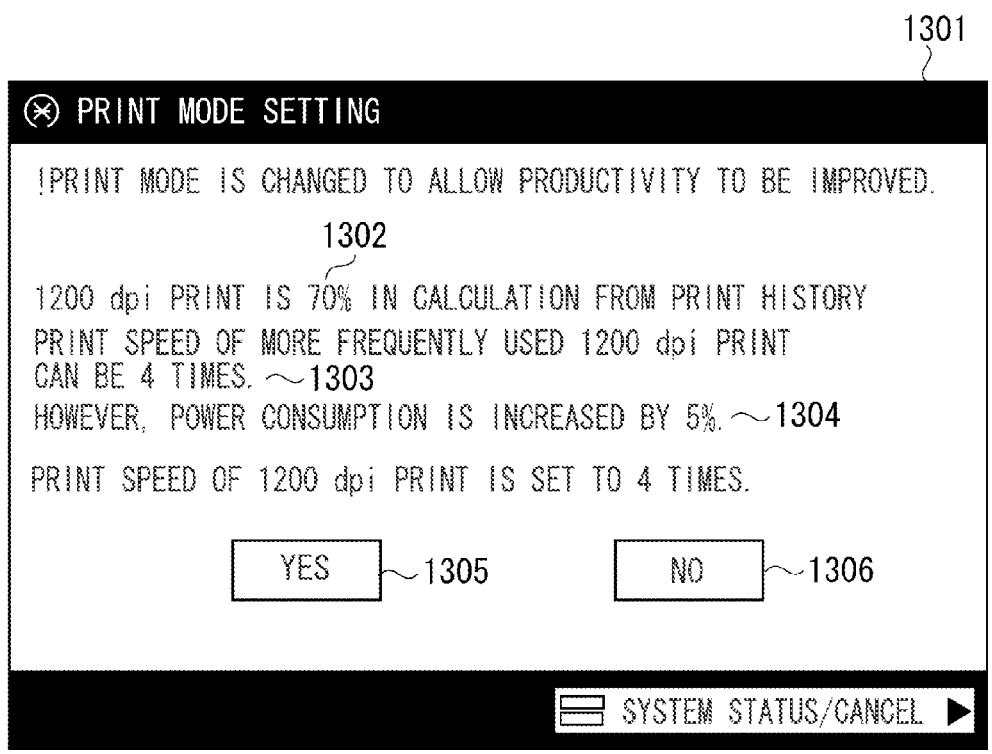
FIG. 13 is a chart illustrating a confirmation screen for instructing the limitation of function of a print mode.

In step S606, the CPU 201 changes a usage limitation so that a print speed at 1200 dpi can be "4 times". As illustrated in FIG. 13, the CPU 201 executes control for displaying a print mode setting screen 1301 on the operation unit 102. In step S607, a usage rate 1302 and a power consumption increase rate 1304 described above, and information 1303 on the change of the usage limitation are displayed.

FIG. 13 is a chart illustrating the print mode setting screen 1301 displayed on the operation unit 102 illustrated in FIG. 3. The example in FIG. 13 illustrates the usage rate of the print mode 1302, the change of the usage limitation 1303, and the power consumption increase rate 1304.

In a state where the confirmation screen is displayed, if the CPU 201 determines that the user presses the "YES" button 1305 (YES in step S608), in step S609, the CPU 201 brings the set state of "1200 dpi high-speed print mode" into the ON state from the OFF state.

On the other hand, in the screen illustrated in FIG. 13, if the CPU determines that the user presses the NO button 1306 (NO in step S608), the CPU 201 keeps the set state of "1200 dpi high-speed print mode" in the OFF state and ends the processing.

According to the present exemplary embodiment, a print mode in which usage limitation may be executed according to the usage status of a print mode in the image processing apparatus used by the user and the power saving effect thereof can be proposed to the user. Thereby, when the user dynamically switches the usage status of a print mode for adaptation to the usage status of a print mode, the user can confirm the power saving effect of the switching.

In the first and second exemplary embodiments, the CPU 201 restricts power supplied to any of the bit-map generation units 302 to 305 used in the "1200 dpi high-speed print mode" to reduce power consumption. However, the present invention is not limited to the present print mode provided that hardware is capable of changing the supply of power.

In the first and second exemplary embodiments, the counted value showing the number of times of use of a print mode is stored as the usage status of the print mode and the usage rate of the print mode is calculated from the counted value. The usage rate of the print mode is calculated each time based on the results of analysis of the print job and may be stored as the usage status of the print mode.

In the first and second exemplary embodiments, the usage rate of the print mode, the content of limitation, and power consumption reduction rate are displayed on the operation panel 102 for the user. The usage rate of the print mode, the content of limitation, and power consumption reduction rate, may be provided to the user on PC 120 via a web page or an e-mail which contains this information. In this case, the image processing apparatus receives instruction indicating whether to change the set state of a print mode from the PC 120.

A user having the authority to increase or decrease the usage limitation of a print mode may be authenticated to allow controlling the image processing apparatus to execute the processing illustrated in FIG. 6. If the usage rate deviates from a predetermined set state, the user may be notified accordingly and urged to set a power saving mode. The user is notified accordingly via e-mail or the management screen.

According to the present invention, the user can switch the operation conditions of the image processing apparatus while confirming a power saving effect.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-020776 filed Feb. 2, 2011, which is hereby incorporated by reference herein in its entirety.

What is claimed is:

1. An image processing apparatus for executing image processing in accordance with operation conditions, the image processing apparatus comprising: a first determination unit configured to determine a number of times of a print mode usage by analyzing a print job, and determine a usage rate of the print mode based on the number of times of the print mode usage and a number of times of print executed by the image processing apparatus; a second determination unit configured to determine an operation condition to be set based on the usage rate determined by the first determination unit; a third determination unit configured to determine how much an amount of electric energy changes if the determined operation condition is set; a display unit configured to display the determined operation condition and how much the amount of electric energy changes; and an instruction reception unit configured to receive an instruction for setting the operation condition.

2. The image processing apparatus according to claim 1, wherein the third determination unit comprises:
   a measurement unit configured to measure a number of times of a print mode usage by analyzing a print job; and
   a calculation unit configured to calculate a usage rate of a print mode based on the number of times of the print mode usage and a number of times of print executed by the image processing apparatus.

3. The image processing apparatus according to claim 1, wherein the display unit is configured to display a confirmation screen indicating how much the amount of electric energy changes, the operation condition to be set, and instruction information for instructing whether to set the operation condition.

4. The image processing apparatus according to claim 3, further comprising a control unit configured to control a setting of the operation condition in accordance with an instruction from a user in response to the instruction information for instructing whether to set the operation condition.

5. The image processing apparatus according to claim 1, further comprising a plurality of image processing units configured to execute the image processing of data used for print processing.

6. The image processing apparatus according to claim 5, further comprising an electric power control unit configured to control electric power supplied to at least one or more image processing units out of the plurality of image processing units in accordance with the operation condition.

7. A method for controlling an image processing apparatus for executing image processing in accordance with an operation condition, the method comprising: determining a number of times of a print mode usage by analyzing a print job, and determining a usage rate of the print mode based on the number of times of the print mode usage and a number of times of print executed by the image processing apparatus; determining an operation condition to be set based on the determined usage rate; calculating electric energy to change if the determined operation condition is set; displaying the determined operation condition to be set and the calculated electric energy; and receiving an instruction for setting the determined operation condition.

8. A non-transitory computer-readable storage medium storing a program for causing an image processing apparatus to execute image processing in accordance with an operation condition, the program comprising: determining a number of times of a print mode usage by analyzing a print job, and determining a usage rate of the print mode based on the number of times of the print mode usage and a number of times of print executed by the image processing apparatus; determining an operation condition to be set based on the determined usage rate; calculating electric energy to be changed if the operation condition is changed; displaying the determined operation condition to be changed and the calculated electric energy; and receiving an instruction for setting the operation condition.

* * * * *